(12) United States Patent
Hayden et al.

(10) Patent No.: US 11,482,712 B2
(45) Date of Patent: Oct. 25, 2022

(54) METAL ALLOY CATALYSTS FOR FUEL CELL ANODES

(71) Applicant: Ilika Technologies, Ltd., Southampton Hampshire (GB)

(72) Inventors: Brian Elliott Hayden, Southampton Hampshire (GB); Jonathan Conrad Davies, Southampton Hampshire (GB); Laura Jane Offin, Southampton Hampshire (GB)

(73) Assignee: Ilika Technologies, Ltd. (GB)

(*) Notice: Subject to any disclaimer, the term of this patent is extended or adjusted under 35 U.S.C. 154(b) by 660 days.

(21) Appl. No.: 15/880,709

(22) Filed: Jan. 26, 2018

(65) Prior Publication Data

US 2018/0226658 A1 Aug. 9, 2018

Related U.S. Application Data

(62) Division of application No. 14/892,014, filed as application No. PCT/GB2014/051626 on May 28, 2014, now abandoned.

(30) Foreign Application Priority Data

May 28, 2013 (GB) ..................... 1309513

(51) Int. Cl.
*H01M 4/92* (2006.01)
*H01M 4/88* (2006.01)
(Continued)

(52) U.S. Cl.
CPC ............... *H01M 4/921* (2013.01); *C22C 5/04* (2013.01); *C22C 27/04* (2013.01); *C22C 30/00* (2013.01);
(Continued)

(58) Field of Classification Search
CPC .... H01M 4/921; H01M 4/8828; H01M 4/926; H01M 2008/1095; C22C 5/04; C22C 27/04; Y02E 60/50; Y02E 50/60
See application file for complete search history.

(56) References Cited

U.S. PATENT DOCUMENTS

2006/0057440 A1* 3/2006 Ballantine ........... H01M 4/8605
429/444
2006/0177728 A1 8/2006 Adzic et al.
(Continued)

FOREIGN PATENT DOCUMENTS

CN 103098275 A 5/2013
EP 1947718 A1 7/2008
(Continued)

OTHER PUBLICATIONS

Hollak, S.A., et al., "Comparison of Tungsten and Molybdenum Carbide Catalysts for the Hydrodeoxygenation of Oleic Acid", ACS Catalysis (2013), vol. 3, pp. 2837-2844.
(Continued)

*Primary Examiner* — Milton I Cano
*Assistant Examiner* — Mary G Henshaw
(74) *Attorney, Agent, or Firm* — Crowell & Moring LLP (57) ABSTRACT

A catalyst for a fuel cell anode comprises an alloy of Pd and at least two other transition metals, at least one of which which binds to hydrogen and/or carbon monoxide at least as strongly as Pd does. Suitable transition metals which bind more strongly are Co, W, Ti, V, Cr, Fe, Mo, Nb, Hf, Ta, Zr and Re. PdCoW is the most preferred alloy. The catalyst is used on the anode of a hydrogen oxidising fuel cell, such as a PEMFC to catalyse the hydrogen oxidation reaction.

12 Claims, 5 Drawing Sheets

(51) Int. Cl.
- *C22C 5/04* (2006.01)
- *C22C 27/04* (2006.01)
- *C22C 30/00* (2006.01)
- *H01M 8/10* (2016.01)

(52) U.S. Cl.
CPC ......... *H01M 4/8828* (2013.01); *H01M 4/926* (2013.01); *H01M 2008/1095* (2013.01); *Y02E 60/50* (2013.01)

(56) References Cited

U.S. PATENT DOCUMENTS

| | | |
|---|---|---|
| 2009/0117447 A1 | 5/2009 | Brace |
| 2011/0151354 A1 | 6/2011 | Jin |
| 2013/0029252 A1 | 1/2013 | Lo |
| 2013/0078548 A1 | 3/2013 | Lee et al. |
| 2013/0224522 A1* | 8/2013 | Maruyama ............ H01M 4/86 429/5 |
| 2013/0280637 A1 | 10/2013 | Horibe |

FOREIGN PATENT DOCUMENTS

| | | |
|---|---|---|
| GB | 2481309 A1 | 12/2011 |
| GB | 2478981 B2 | 2/2012 |
| JP | 2006260909 A | 9/2006 |
| JP | 2007294332 A | 11/2007 |
| JP | 2008305561 A | 12/2008 |
| TW | 201223634 A | 6/2012 |
| WO | 2007042841 | 4/2007 |
| WO | 2008/009742 | 1/2008 |

OTHER PUBLICATIONS

Chinese Office Action (English Translation) for Application No. 201480030248.0, dated Sep. 7, 2018.
English translation of Japanese Office Action for JP 2016-516240, dated Jul. 2, 2018.
Fuel Cells and Polymers—Advanced Polymer Materials One Point 7, Society of Polymer Science, Japan Ed. (Kobunshi Sentan Zairyo One Point 7 Nenryo Denchi), (Nov. 10, 2005), 1st edition, p. 20. (with English translation).
English translation of Japanese Office Action for JP 2016-516240, dated Feb. 6, 2018.
Iwanami Dictionary of Physics and Chemistry (1998), 5th edition, pp. 619-620 (with English translation).
Environmental Conscious New Material Series: Fuel Cell Material (Kankyo Chouwagata Shinzairyou Series, Nenryou Dench Zairyou), Nikkan Kogyo Shimbun Ltd. (2007), 1st Edition, pp. 109-111 (with English translation).
Chinese Office Action (English Translation) for Application No. 201480030248.0, dated Mar. 7, 2019.
Japanese Office Action (English Translation) for Application No. 2018-205409, dated Oct. 8, 2019.
Al-Odail F A, Anastasopoulos A, and Hayden B E, The hydrogen evolution reaction and hydrogen oxidation reaction or thin film PdAu alloy surfaces, Physical Chemistry Chemical Physics, 2010, 12(37) p. 11398-11406.
Alcaide F et al., Performance of carbon-supported PtPd as catalyst for hydrogen oxidation in the anodes of proton exchange membrane fuel cells, International Journal of Hydrogen Energy, 2010. 35(20): p. 11634-11641.

Al-Odail, F., A. Anastasopoulos, and B. Hayden, Hydrogen Evolution and Hydrogen Oxidation on Palladium Bismuth Alloys, Topics in Catalysis, 2011. 54(1-4): pp. 77-82.
Bonnefont, A. et al., Hydrogen electrooxidation on PdAu supported nanoparticles: An experimental RDE and kinetic nodeling study, Catalysis Today, 2013. 202: p. 70-78.
Christoffersen, E., et al., Anode Materials for Low-Temperature Fuel Cells: A Density Functional Theory Study, Journal of Catalysis, 2001. 199(1): p. 123-131.
Fernandez J L, Walsh D A and Bard A J, Thermodynamic Guidelines for the Design of Bimetallic Catalysts for Oxygen Electroreduction and Rapid Screening by Scanning Electrochemical Microscopy. M—Co (M: Pd, Ag, Au), Journal of the American Chemical Society, 2004, 127(1), pp. 357-365.
Frese K.W., Calculation of surface binding energy for hydrogen, oxygen, and carbon atoms on metallic surfaces, Surface Science. 182 (1987) 85-97.
Fuel Cell Handbook (2004, Seventh Edition) by EG&G Technical Services, Inc., available to the public from the National Technical Information Service, U.S. Department of Commerce, 5285 Port Royal Road, Springfield, VA 22161, U.S.A (Section 3, Polymer Electrolyte Fuel Cells is particularly relevant).
Greeley J et al., Computational high-throughput screening of electrocatalytic materials for hydrogen evolution, Nature Materials, 2006, 5(11) pp. 909-913.
Lukaszewski, M., K. Hubkowska, and A. Czerwinski, Electrochemical absorption and oxidation of hydrogen on palladium alloys with platinum, gold and rhodium, Physical Chemistry Chemical Physics, 2010. 12(43): p. 14567-14572.
Norskov J K et al., Trends in the Exchange Current for Hydrogen Evolution, Journal of the Electrochemical Society, 2005, 152(3) p. J23-J26.
Pattabiraman R, Electrochemical investigations on carbon supported palladium catalysts, Applied Catalysis A Seneral, 1997, 153(1-2) p. 9-20.
Raghuveer, V., A. Manthiram, and A.J. Bard, Pd—Co—Mo Electrocatalyst for the Oxygen Reduction Reaction in Proton Exchange Membrane Fuel Cells, The Journal of Physical Chemistry B, 2005 109(48): p. 22909-22912.
Schmidt, T.J., et al., Electrooxidation of H2, CO and H2/CO on well-characterized Au(1 1 1)—Pd surface alloys, Electrochimica Acta, 2003.48(25-26): p. 3823-3828.
Schmidt, T.J., et al. On the CO tolerance of novel colloidal PdAu/carbon electrocatalysts, Journal of Electroanalytical Chemistry, 2001. 501(1-2): p. 132-140.
Shao, M., Palladium-based electrocatalysts for hydrogen oxidation and oxygen reduction reactions, Journal of Power Sources, 2011. 196(5): p. 2433-2444.
Simonov, A.N., et al., Hydrogen electrooxidation over palladium-gold alloy: Effect of pretreatment in ethylene on catalytic activity and CO tolerance, Electrochimica Acta, 2012. 76(0): p. 344-353.
Toyoshima I and G.A. Somorjai, Heats of Chemisorption of O2, H2, Co, CO2, and N2 on Polycrystalline and Single Crystal Transition Metal Surfaces, Catalysis Rev. Sci. Eng. 19 (1979) 105.
Office Action from Chinese Patent Office for CH201480030248.0, dated Apr. 6, 2017.
Castanon, M.G., et al., "Catalytic Properties of Pd70Co20Mo10 and a Comparison of its Experimental and Theoretical Structure", The Open Inorganic Chemistry Journal, vol. 2 (2008), pp. 34-38.
International Search Report for PCT/GB2014/051626, dated Jul. 30, 2014.

* cited by examiner

METAL ALLOY CATALYSTS FOR FUEL CELL ANODES

This application is a divisional application of U.S. application Ser. No. 14/892,014, filed Nov. 18, 2015, which is a National Stage application of International Application No. PCT/GB2014/051626, filed May 28, 2014, which claims the benefit of United Kingdom Application No. 1309513.8, filed May 28, 2013.

This invention relates to metal alloy catalysts for fuel cell anodes, to anodes and fuel cells including such catalysts, methods of manufacturing such anodes, use of such metal alloy catalysts for manufacturing anodes and oxidising fuel, methods of oxidising fuel in a fuel cell including such anodes and methods of thereby producing electrical energy. In particular the catalysts are alloys of palladium and metals which individually bind at least as strongly to hydrogen and/or carbon monoxide as palladium and the catalyst is applied to anodes for the Hydrogen Oxidation Reaction (HOR).

A fuel cell comprises an anode where fuel is oxidised and a cathode where an oxidising species such as oxygen is reduced. An electrolyte allows for the transport of ions between the electrodes. Fuel and oxidiser are supplied separately to each electrode. As fuel is oxidised at the anode, electrons are released and pass through an external circuit to the cathode where they are consumed in the reduction of the oxidising species. In a polymer electrolyte membrane fuel cell (PEMFC) the fuel used is usually hydrogen and the oxidising species is usually oxygen; the polymer electrolyte is capable of allowing the flow of protons from the anode to the cathode.

Hydrogen is the most common fuel in fuel cells and the HOR is the most common reaction at the anode. Other fuels can be used, such as methanol, for example in direct methanol fuel cells which are especially useful for portable appliances, in which case the methanol oxidation reaction would take place at the anode, but this invention is primarily directed towards a catalyst for the HOR.

Catalysts are needed at both the cathode and the anode to allow the oxygen reduction reaction (ORR) and the hydrogen oxidation reaction (HOR) respectively to occur. Platinum is a good catalyst for both reactions and generally either platinum or platinum alloy based materials have been used to facilitate the reactions. Usually for a catalyst to be ideal for a particular reaction the reactants, products and/or reaction intermediates should be bound to the catalyst surface neither too strongly or too weakly as this may affect the rate determining step within a reaction. "Norskov et al" (Nørskov, J. K., et al., Journal of The Electrochemical Society, 2005. 152(3): p. J23-J26.) and "Greeley et al" (Greeley, J., et al., Nat Mater, 2006. 5(11): p. 909-913.) have compared the hydrogen binding energies for several transition metals to their activity for the hydrogen evolution reaction (the reverse of the hydrogen oxidation reaction). It is clear that platinum is the ideal metal for these reactions compared to other metals which bind hydrogen more or less strongly. However platinum is a rare and expensive metal and much effort has been put into finding alternative fuel cell catalysts to replace platinum or to enhance the activity of platinum for the relevant reactions to allow for lower loadings.

The limiting reaction in a fuel cell is generally the oxygen reduction reaction which takes place at the cathode. A large overpotential for the oxygen reduction reaction is seen due to poisoning of the catalyst surface due to presence of a surface platinum oxide. There has been much research into identifying alternative catalysts for the oxygen reduction reaction in fuel cells. Interest has been shown in palladium and palladium alloys as alternative cathode catalysts in fuel cells. Palladium, although it binds oxygen more strongly than platinum and therefore is a less effective oxygen reduction catalyst, still has relatively high activity for the reaction and is cheaper than platinum. Therefore it can potentially reduce the costs of the catalysts used for the ORR. Other metals have been alloyed with palladium to try to increase the activity of palladium for the oxygen reduction reaction.

Alloys containing cobalt along with palladium have been shown to improve the activity of palladium for the oxygen reduction reaction (for example Fernández, J. L., D. A. Walsh, and A. J. Bard, Journal of the American Chemical Society, 2004. 127(1): p. 357-365.). It has been suggested that cobalt enhances the activity of the palladium by preferentially binding and dissociating the oxygen, leaving more free surface sites on the palladium to carry out the reduction process. However it has also been shown that palladium cobalt as a binary alloy is not particularly stable under fuel cell operating conditions and that stability is enhanced by the addition of a third alloying element. Several elements have been identified as adding stability to alloys used for cathodes in the fuel cell environment, including tungsten in WO2007042841.

As the hydrogen oxidation reaction is not the limiting reaction within the fuel cell, the loadings of platinum catalyst at the anode can be significantly reduced. Therefore there has been less focus on finding alternative catalysts for the hydrogen oxidation reaction (due to lower cost of the anode catalyst in comparison to the cathode catalyst). There has been focus, however, on alloying platinum with other metals to decrease the poisoning of the platinum surface with contaminants within the fuel stream, such as carbon monoxide. Platinum-ruthenium alloys are currently the standard anode catalyst of choice in PEM fuel cells.

Some research (e.g. Pattabiraman, R., Applied Catalysis A: General, 1997. 153(1-2): p. 9-20.) has focussed on palladium as an anode catalyst, however palladium binds hydrogen more strongly than platinum and can also absorb hydrogen into its structure. Therefore at the potentials that an anode catalyst must operate in a PEM fuel cell, palladium is unlikely to be stable due to the expansion and contraction the palladium lattice undergoes due to hydrogen absorption.

As set out below, several palladium alloy catalysts have been suggested as hydrogen oxidation or hydrogen evolution catalysts. As the hydrogen evolution/oxidation reaction is very reversible, it has been shown that if a catalyst is active for hydrogen evolution, then in general it is active for the hydrogen oxidation reaction (e.g. Al-Odail, F. A., A. Anastasopoulos, and B. E. Hayden, Physical Chemistry Chemical Physics, 2010. 12(37): p. 11398-11406).

"Norskov et al" and "Greeley et al" have suggested that if a metal that binds hydrogen strongly is alloyed with a metal that binds hydrogen weakly that the alloy will have an activity for hydrogen evolution superior to the two parent metals. It is therefore not surprising that many of the palladium alloys considered in the literature for hydrogen evolution or hydrogen oxidation catalysts have been palladium alloyed with a metal that Norskov et al have suggested has a weaker interaction with hydrogen, for example Au, Rh, Pt, Bi or Ir. Alloys of Pd and these metals are described in the following papers and patents:

Schmidt, T. J., et al. Journal of Electroanalytical Chemistry, 2001. 501(1-2): p. 132-140.

Al-Odail, F., A. Anastasopoulos, and B. Hayden, Topics in Catalysis, 2011. 54(1-4): p. 77-82.

Al-Odail, F. A., A. Anastasopoulos, and B. E. Hayden, Physical Chemistry Chemical Physics, 2010. 12(37): p. 11398-11406.

Bonnefont, A., et al., Catalysis Today, 2013. 202(0): p. 70-78.

Gibbs, C., F. Liu, and D. Papageorgopoulos, GB2481309 A, 2011.

Hayden, B. E. and A. Anastasopoulos, GB2478981B, 2012.

Lukaszewski, M., K. Hubkowska, and A. Czerwinski, Physical Chemistry Chemical Physics, 2010. 12(43): p. 14567-14572.

Schmidt, T. J., et al., Electrochimica Acta, 2003. 48(25-26): p. 3823-3828.

Simonov, A. N., et al., Electrochimica Acta, 2012. 76(0): p. 344-353.

Alcaide, F., et al., International Journal of Hydrogen Energy, 2010. 35(20): p. 11634-11641.

The reader may also be interested by Shao, M., Journal of Power Sources, 2011. 196(5): p. 2433-2444 which describes recent developments in palladium based electrocatalysts for both the HOR and the ORR, and mentions a number of the alloys discussed above.

Against this background, a first aspect of the invention provides a catalyst for a fuel cell anode comprising Pd and at least two other transition metals, at least one of which binds to hydrogen and/or carbon monoxide at least as strongly as Pd does. It will be understood that at least two "other" transition metals, requires that the two other transition metals are neither Pd nor the same as each other.

Preferably at least one of the at least two other transition metals binds to hydrogen at least as strongly as Pd does. Alternatively at least one of the at least two other transition metals binds to carbon monoxide at least as strongly as Pd does. In the third alternative at least one of the at least two other transition metals binds to carbon monoxide and hydrogen at least as strongly as Pd does.

More preferably at least one of the other transition metals binds to hydrogen and/or carbon monoxide more strongly than Pd does.

Preferably at least one of the at least two other transition metals binds to hydrogen more strongly than Pd does. Alternatively at least one of the at least two other transition metals binds to carbon monoxide more strongly than Pd does. In the third alternative at least one of the at least two other transition metals binds to carbon monoxide and hydrogen more strongly than Pd does.

Surprisingly, it has been found that such a catalyst (which has been proposed for the ORR before, e.g. in WO2007042841, but which goes against the convention for obtaining a HOR catalyst of alloying Pd with a metal which binds hydrogen or carbon monoxide less strongly, in order to attain the optimum binding energies for reaction intermediates), has good activity for the HOR, and overcomes the problem of hydrogen absorption by Pd catalysts.

Preferably two of the at least two other transition metals bind to hydrogen and/or carbon monoxide more strongly than Pd does. Clearly this "and/or" formulation could be limited to any of: (i) wherein two of the at least two other transition metals bind to hydrogen more strongly than Pd does; (ii) wherein two of the at least two other transition metals bind to carbon monoxide more strongly than Pd does; or (iii) wherein two of the at least other two transition metals bind to carbon monoxide and hydrogen more strongly than Pd does.

Methods of determining the relative strength of binding of hydrogen and carbon monoxide are well known in the art. In a preferred embodiment, the relative binding strength in accordance with the invention may be measured experimentally using the methods of Toyoshima and Somorjai (I. Toyoshima and G. A. Somorjai, Catalysis Rev.—Sci. Eng. 19 (1979) 105). In an alternative embodiment the Polar Covelance method developed by Sanderson and used by Karl W Frese Jr. to obtain the values shown in K. W. Frese, Surface Science. 182 (1987) 85-97, may be used. Most preferably the relative strength of hydrogen binding is as set out in table 1 of "Norskov et al".

One preferred definition of the two other transition metals that bind to hydrogen and/or CO stronger than Pd is based on the affinity for CO. Christoffersen et al (Christoffersen, E., et al., Journal of Catalysis, 2001. 199(1): p. 123-131) have suggested that in general binding energies for CO follow binding energies for hydrogen and that in general the further to the left of the periodic table the stronger the interaction with CO. Therefore the transition metals which bind CO stronger than palladium can be expected to be the same metals as described above (which are all to the left of Pd, i.e. in groups 3-9) and any other transition metals to the left of Pd in the periodic table.

Based on these definitions certain preferred groups of transition metals can be defined. The simplest definition based on the trend that CO binding increases towards the left of the periodic table, is of a preferred group for the other metals consisting of all transition metals left of palladium in the periodic table. Another preferred group is all group 4 to group 9 metals. Another preferred group is all group 4 to group 9 transition metals other than manganese and technetium. A more preferred group is the group 4 to group 9 transition metals, other than Mn, Tc, Os and Ir. More preferable still is group 4 to group 9 transition metals other than Mn, Tc, Os, Ir and the other two platinum group metals, Ru and Rh. Although Ru and Rh bind CO more strongly than Pd, and Frese states that Ru also binds hydrogen more strongly, they are both expensive, and considering the intention of the invention to provide a cheaper alternative to the standard Pt/Ru anode catalyst, cost, as well as utility, should be considered. Accordingly, a group of preferred metals, with properties quite distinct from the platinum group and which bind more strongly to hydrogen and/or carbon monoxide are set out in claims 6 and 7. Most preferred are Co and W.

In addition to the surprising effect of good activity as a catalyst for the HOR, and overcoming the absorption problem of unalloyed Pd, the inclusion of metals which bind more strongly than Pd to CO, should lead to improved tolerance of carbon monoxide impurities in the hydrogen fuel stream.

Preferably the catalyst consists essentially of Pd and two other transition metals; although in addition to such a ternary catalyst, quaternary catalysts including the claimed features, and even alloys containing 5 or more metals are envisaged by the invention.

Further preferred features of the invention, such as particularly desirable combinations of transition metals are set out in the dependent claims.

In a second aspect of the invention, there is provided a fuel cell anode comprising a substrate and a catalyst comprising Pd and at least two other transition metals, at least one of which binds to hydrogen and/or carbon monoxide at least as strongly as Pd does. Preferably the catalyst is as defined in the dependent claims.

Preferably the anode is a hydrogen oxidising fuel cell anode. The catalyst of the invention appears particularly suited to oxidising hydrogen as a fuel, as opposed to oxidising methanol or formic acid, for example.

In a third aspect of the invention, there is provided a fuel cell comprising: an anode comprising a substrate and a catalyst comprising Pd and at least two other transition metals, at least one of which binds to hydrogen and/or carbon monoxide at least as strongly as Pd does; a cathode;

an electrolyte; a fuel supply; and a supply of oxidant. Preferably the fuel is hydrogen gas and preferably the electrolyte comprises a polymer electrolyte membrane.

In a fourth aspect of the invention, there is provided a method of manufacturing an anode comprising applying a catalyst comprising Pd and at least two other transition metals, at least one of which binds to hydrogen and/or carbon monoxide at least as strongly as Pd does, optionally supported on a support, to an electrically conductive substrate.

A fifth aspect of the invention, provides use of a catalyst comprising Pd and at least two other transition metals, at least one of which binds to hydrogen and/or carbon monoxide at least as strongly as Pd does for the oxidation of fuel in a fuel cell.

Preferably the use is for oxidation of hydrogen in a fuel cell as set out above.

A sixth aspect of the invention provides use of a catalyst comprising Pd and at least two other transition metals, at least one of which binds to hydrogen and/or carbon monoxide at least as strongly as Pd does in the manufacture of an anode. Preferably the use is in the manufacture of an anode as set out above; and more preferably the anode is for a fuel cell as set out above.

A seventh aspect of the invention provides a method of oxidising fuel in a fuel cell comprising supplying fuel to the anode of the fuel cell, wherein the anode includes a catalyst comprising Pd and at least two other transition metals, at least one of which binds to hydrogen and/or carbon monoxide at least as strongly as Pd does. Preferably the fuel is hydrogen. More preferably the method generates electricity.

The invention will now be described in detail with reference to the figures, in which.

The invention and its efficacy are further illustrated in the following Example.

Three different catalysts have been investigated and compared in this study. These are a first comparative example of Pd black powder, a second comparative example of 70 wt. % (weight per cent) Pt on carbon powder and an example of the invention consisting of 40 wt. % PdCoW on carbon powder. The PdCoW catalyst has a composition of 50 at. % (atomic per cent) Pd, 43 at. % Co and 7 at. % W.

The Pd black powder was obtained from Aldrich and the platinum on carbon was obtained from Alfa Aesar. PdCoW on carbon can be synthesised according to several well-known techniques, so the details are not provide here. WO2007042841; Fernández, J. L., D. A. Walsh, and A. J. Bard, Journal of the American Chemical Society, 2004. 127(1): p. 357-365; and Raghuveer, V., A. Manthiram, and A. J. Bard, The Journal of Physical Chemistry B, 2005. 109(48): p. 22909-22912 all of which are incorporated by reference, provide instruction on production of such catalysts.

A small amount of each catalyst (40 mg) was made into an ink by mixing with 7 ml of deionised water and 80 µl of 5% nafion solution. The mixture was sonicated in an ultrasonic bath for 2 hours. 5 µl of an ink was pipetted onto a freshly polished glassy carbon rotating disc electrode (RDE), with a diameter of 0.5 cm. The electrode was polished prior to deposition of the ink using polishing pads and two different grades of alumina suspension (0.3 and 0.05 µm diameter alumina particles). Three minutes of polishing was carried out initially on 0.3 µm alumina to remove any previous material, then another 3 minutes on another pad with 0.3 µm alumina and finally 3 minutes on 0.05 µm alumina. The inks were left to dry overnight and the electrode was then attached to a rotating shaft and lowered into a three compartment electrochemical cell for analysis. A platinum gauze electrode was used as a counter electrode and a commercially available Mercury-Mercury Sulphate reference electrode was used. All potentials have been converted and will be quoted against the Reversible Hydrogen Electrode (RHE). All experiments were carried out in 0.1 M HClO$_4$ $_{(aq)}$. Cyclic voltammetry experiments were carried out with and without rotation of the electrode using a potentiostat built in-house.

The electrochemical screening procedure carried out on each sample is shown in Table 1 below.

TABLE 1

Experimental procedure applied to the catalyst inks deposited on glassy carbon RDE electrodes.

| Experiment | Gas | Potential limits/ V vs. RHE | Sweep rate/ mV s$^{-1}$ | Rotation rate/rpm |
|---|---|---|---|---|
| 3 CVs in deoxygenated solution | Bubbling Ar 20 min Ar above solution | 0.025-1.00 | 100 | 0 |
| | Bubbling Ar 10 min | −0.002 | | |

TABLE 1-continued

Experimental procedure applied to the catalyst inks deposited on glassy carbon RDE electrodes.

| Experiment | Gas | Potential limits/ V vs. RHE | Sweep rate/ mV s$^{-1}$ | Rotation rate/rpm |
|---|---|---|---|---|
| 3 CVs in deoxygenated solution | Ar above solution | −0.025-0.5 | 3 | 0 |
| | Bubbling Ar 10 min | −0.002 | | |
| 3 CVs in deoxygenated solution | Ar above solution | −0.025-0.5 | 3 | 400 |
| | Bubbling Ar 10 min | −0.002 | | |
| 3 CVs in deoxygenated solution | Ar above solution | −0.025-0.5 | 3 | 900 |
| | Bubbling Ar 10 min | −0.002 | | |
| 3 CVs in deoxygenated solution | Ar above solution | −0.025-0.5 | 3 | 1600 |
| | Bubbling H$_2$ 10 min | | | |
| 3 CVs in H$_2$ saturated solution | H$_2$ above solution | −0.025-mass transport limited region (between 0.4 and 0.6 V) | 3 | 0 |
| | Bubbling H$_2$ 10 min | | | |
| 3 CVs in H$_2$ saturated solution | H$_2$ above solution | −0.025-mass transport limited region (between 0.4 and 0.6 V) | 3 | 400 |
| | Bubbling H$_2$ 10 min | | | |
| 3 CVs in H$_2$ saturated solution | H$_2$ above solution | −0.025-mass transport limited region (between 0.4 and 0.6 V) | 3 | 900 |
| | Bubbling H$_2$ 10 min | | | |
| 3 CVs in H$_2$ saturated solution | H$_2$ above solution | −0.025-mass transport limited region (between 0.4 and 0.6 V) | 3 | 1600 |
| | Bubbling Ar 20 min | | | |
| 3 CVs in deoxygenated solution | Ar above solution | 0.025-1.00 | 100 | 0 |
| 3 CVs in deoxygenated solution | Ar above solution | 0.025-1.00 | 20 | 0 |

Figure 1:
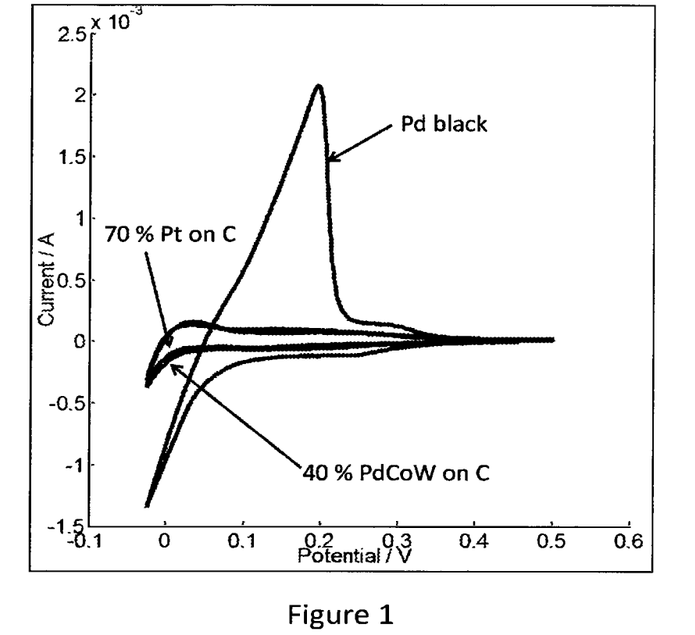
FIG. 1 shows cyclic voltammograms (CVs) between approximately −0.025 V and 0.5-0.6 V vs. RHE for glassy carbon RDE electrodes with inks of: 70 wt. % Pt on C, 40 wt. % PdCoW on C and Pd black in Ar purged 0.1 M HClO$_4$ at 20 mV s$^{-1}$, all potentials are vs. RHE.

FIG. 1 shows the cyclic voltammograms (CVs) for electrodes with the comparative examples of palladium black and 70 wt. % Pt on carbon and the example of 40 wt. % PdCoW on carbon in Ar purged 0.1 M HClO$_4$ at 20 mV s$^{-1}$ in the hydrogen adsorption/desorption and hydrogen evolution/oxidation region (i.e. between approximately −0.025 and 0.6 V vs. RHE).

Figure 1A:
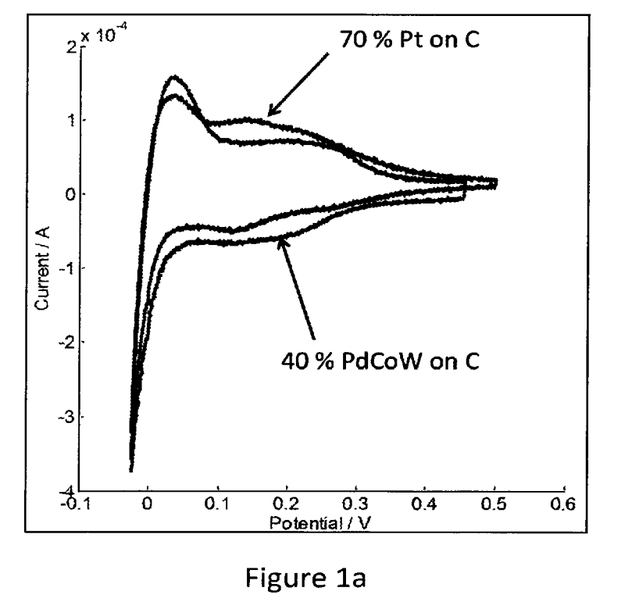
FIG. 1*a* shows the same plots of FIG. 1, but just showing 70 wt. % Pt on C and 40 wt. % PdCoW on C.

Between approximately 0 and 0.4 V vs. RHE all of the catalysts show features relating to adsorption of hydrogen (reduction currents—negative) and desorption of hydrogen (oxidation currents—positive). Below approximately 0 V vs. RHE on all of the catalysts, the onset of hydrogen evolution can be seen as a sharp onset reduction current, this can be seen more clearly for the Pt and PdCoW catalysts in FIG. 1 a, because FIG. 1a is scaled to the currents obtained. On the Pd black catalyst a larger reduction current is seen below 0 V vs. RHE, this is believed to be due to not only hydrogen evolution, but also absorption of hydrogen into the bulk structure of the palladium. The Pd black catalyst also has a potentially larger surface area of active catalyst than the other catalysts, leading to higher currents. The large oxidation peak seen on the reverse sweep is due to oxidation of not only evolved hydrogen from the surface, but also oxidation of hydrogen absorbed within the bulk of the palladium. On the Pt and PdCoW catalysts an oxidation peak just above 0 V vs. RHE is seen, this is due to oxidation of the hydrogen evolved at the electrode surface. It can be seen that the features of the PdCoW catalyst are very similar to those seen on the Pt catalyst and that peaks relating to the absorption of hydrogen and oxidation of absorbed hydrogen do not appear to be present, suggesting no significant absorption of hydrogen is occurring within the palladium alloy. As mentioned above, absorption, in contrast to adsorption, results in large volume changes which damage the catalyst. Accordingly the absence of absorption is advantageous.

Figure 2:
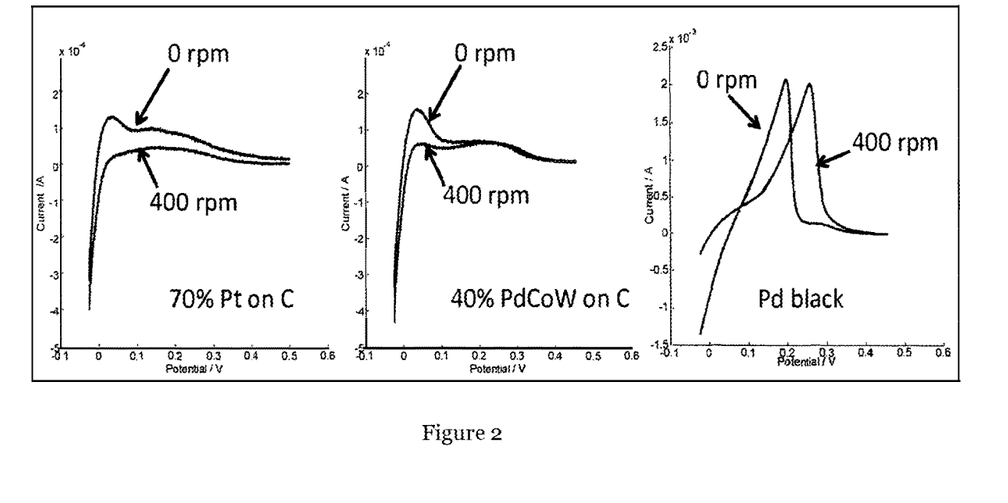
FIG. 2 shows the positive going sweeps of the CVs in the same region as FIG. 1 in Ar purged 0.1 M HClO$_4$ at 20 mV s$^{-1}$ for glassy carbon RDE electrodes with inks of each of the catalysts, the sweeps are compared with and without rotation at 400 rpm.

FIG. 2 shows the positive going sweeps of the CVs in the same region as FIG. 1 for each of the catalysts with and without rotation of the electrode in Ar purged 0.1 M HClO$_4$. For the platinum electrode (comparative example) when the electrode is rotated the currents seen are decreased and there is no longer a peak just above 0 V relating to oxidation of hydrogen that has been evolved at the electrode surface. This suggests that the evolved hydrogen is moved away from the electrode during rotation. The remaining currents seen are due to desorption of adsorbed hydrogen on the electrode surface.

A similar effect is seen on the PdCoW catalyst of the invention, this confirms that the electrode does not significantly absorb hydrogen. In contrast the Pd black electrode (comparative example) has quite different features. When the electrode undergoes rotation, the currents seen are also decreased similar to the other two electrodes; this is presumed to be due to the removal of evolved hydrogen on or near the electrode surface under rotation. However a large oxidation current is still observed, due to the oxidation of hydrogen absorbed in the bulk of the material.

When Pd has been alloyed with Au, Pt, Rh or Pt and Au in the prior art, less hydrogen absorption and faster kinetics of the absorption, desorption process has been seen (Lukaszewski, M., K. Hubkowska, and A. Czerwinski, Physical Chemistry Chemical Physics, 2010. 12(43): p. 14567-14572). This effect has been not only associated with changes in the lattice structure due to alloying, but due to electronic effects (i.e. lower binding energies with hydrogen—all of the alloying elements selected bind hydrogen less strongly than Pd). However both Co and W bind hydrogen at least as strongly as Pd, therefore the surprising results here might be explained by changes in the lattice structure of palladium on alloying, which may not allow the hydride to form.

Figure 3:
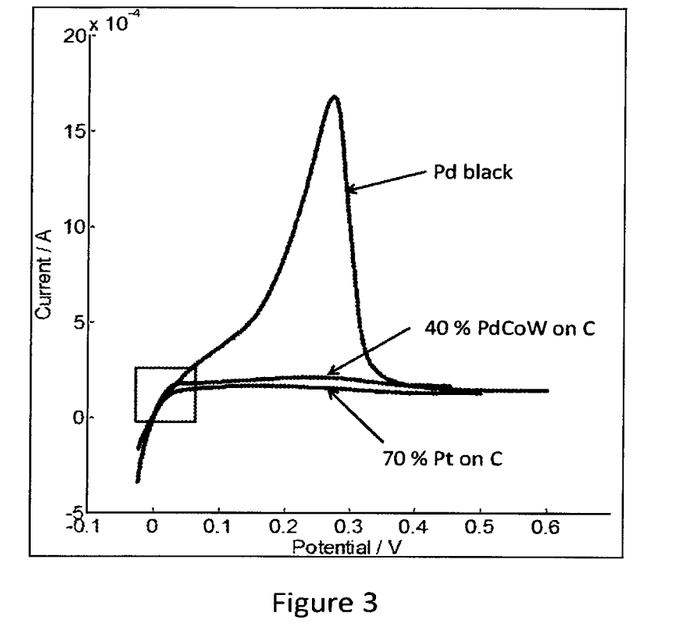
FIG. 3 shows the positive going sweep of cyclic voltammetry experiments for glassy carbon RDE electrodes with inks of 70 wt. % Pt on C, 40 wt. % PdCoW on C and Pd black in H$_2$ saturated 0.1 M HClO$_4$ at 20 mV s$^{-1}$ at 400 rpm.
Figure 3A:
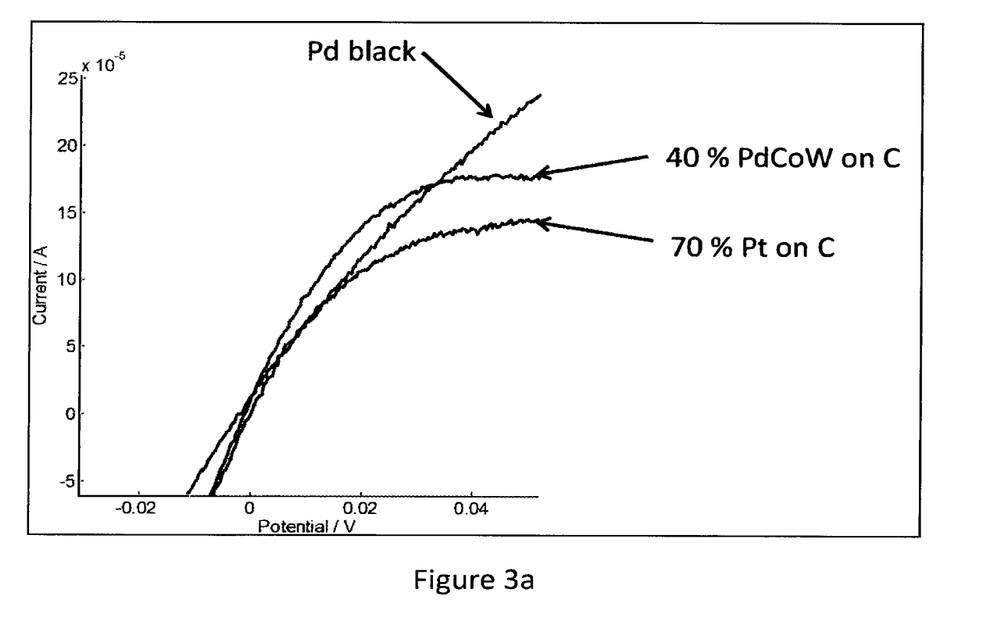
FIG. 3*a* is a zoomed view of the region in FIG. 3 where the currents first become positive (i.e. as hydrogen oxidation begins to occur)

FIG. 3 shows the positive going sweep of cyclic voltammetry experiments for the three different catalysts (i.e. the comparative examples of palladium black and 70 wt. % Pt on carbon and the example of 40 wt. % PdCoW on carbon) in $H_2$ saturated 0.1 M $HClO_4$ at 20 mV $s^{-1}$ at 400 rpm. FIG. 3a is an enlarged view of the region where the currents first become positive (i.e. as hydrogen oxidation begins to occur). Above approximately 0.4 V vs. RHE all of the catalysts show a flat current profile. In this region the hydrogen oxidation reaction is limited by transport of hydrogen to the surface of the electrode from solution. The difference between the currents in this region for the different electrodes is considered to be mainly due to slightly different geometric surface areas of the ink deposits. The ink deposits do not cover the whole area of the electrode surface and therefore will have formed deposits with differing shapes and sizes. All of the hydrogen that is getting to the surface is reacting in this potential region, therefore differences in current can be explained by the difference in the size of the ink deposits rather than any effect of the specific catalysts.

The plot of FIG. 3a gives more information about which catalysts are more active. At very low potentials between 0-0.005 V vs. RHE, the Pt (comparative example) and PdCoW (example) catalyst traces show a very similar gradient, however the Pd black (comparative example) catalyst has a slightly less steep onset gradient. This might suggest a slightly faster reaction on the Pt and PdCoW catalyst than on the Pd black, however the differences are only slight and the hydrogen oxidation reaction occurs so fast that these differences are hard to quantify. The most significant difference between the three catalysts is the large oxidation peak seen on the Pd black catalyst, due to the oxidation of absorbed hydrogen from the bulk of the material.

Figure 4:
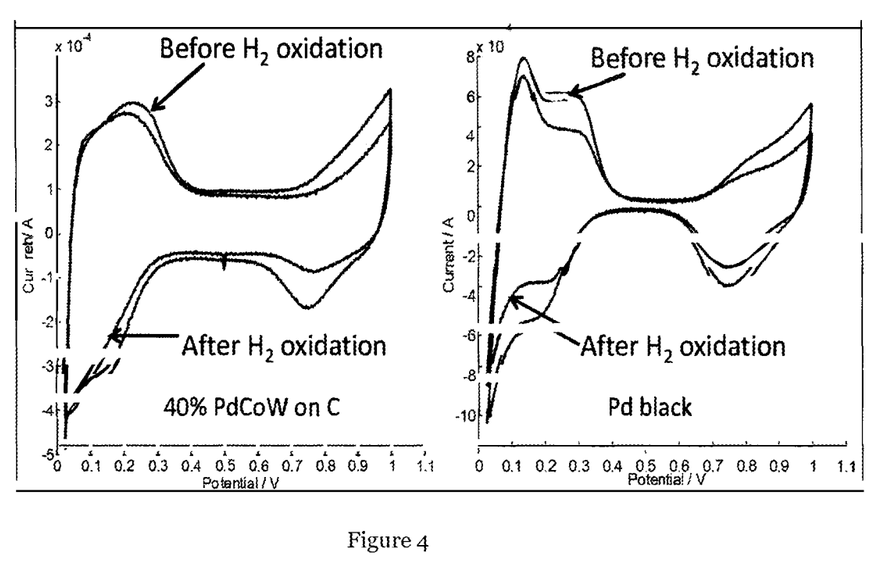
FIG. 4 shows cyclic voltammograms between approximately 0 and 1 V vs. RHE for electrodes with inks of 40 wt. % PdCoW on C and Pd black in Ar purged 0.1 M HClO$_4$ at 100 mV s$^{-1}$ before and after hydrogen oxidation experiments have been carried out.

FIG. 4 shows a comparison between the cyclic voltammetry in Ar purged 0.1 M $HClO_4$ at 100 mV $s^{-1}$ before and after hydrogen oxidation experiments have been carried out for the PdCoW catalyst (of the invention) and the Pd black catalyst (of a comparative example). All of the voltammograms show features relating to hydrogen adsorption and desorption (between approximately 0 and 0.4 V vs. RHE) and palladium oxide formation and reduction (between approximately 0.6 and 1 V vs. RHE). The charge under the hydrogen adsorption and desorption features give a rough indication of the palladium surface area of the catalysts. The charge under these features on the PdCoW catalyst have decreased slightly after hydrogen oxidation experiments have been carried out. This suggests a small decrease in the palladium surface area, which may be due to a small loss of palladium from the material or due to restructuring of the material. However these changes are much more significant for the Pd black catalyst, suggesting a significant change in the palladium surface area. This is probably due to a significant loss in material during the experiments due to the expansion and contraction of the structure with absorption and desorption of hydrogen.

A MEA (membrane electrode assembly) was produced with a standard Pt catalyst at the cathode and a 40 wt. % PdCoW alloy supported on carbon at the anode (with an anode loading of 0.31 mg (of the alloy) $cm^{-2}$, with an ink containing 25 wt. % nafion).

Figure 5:
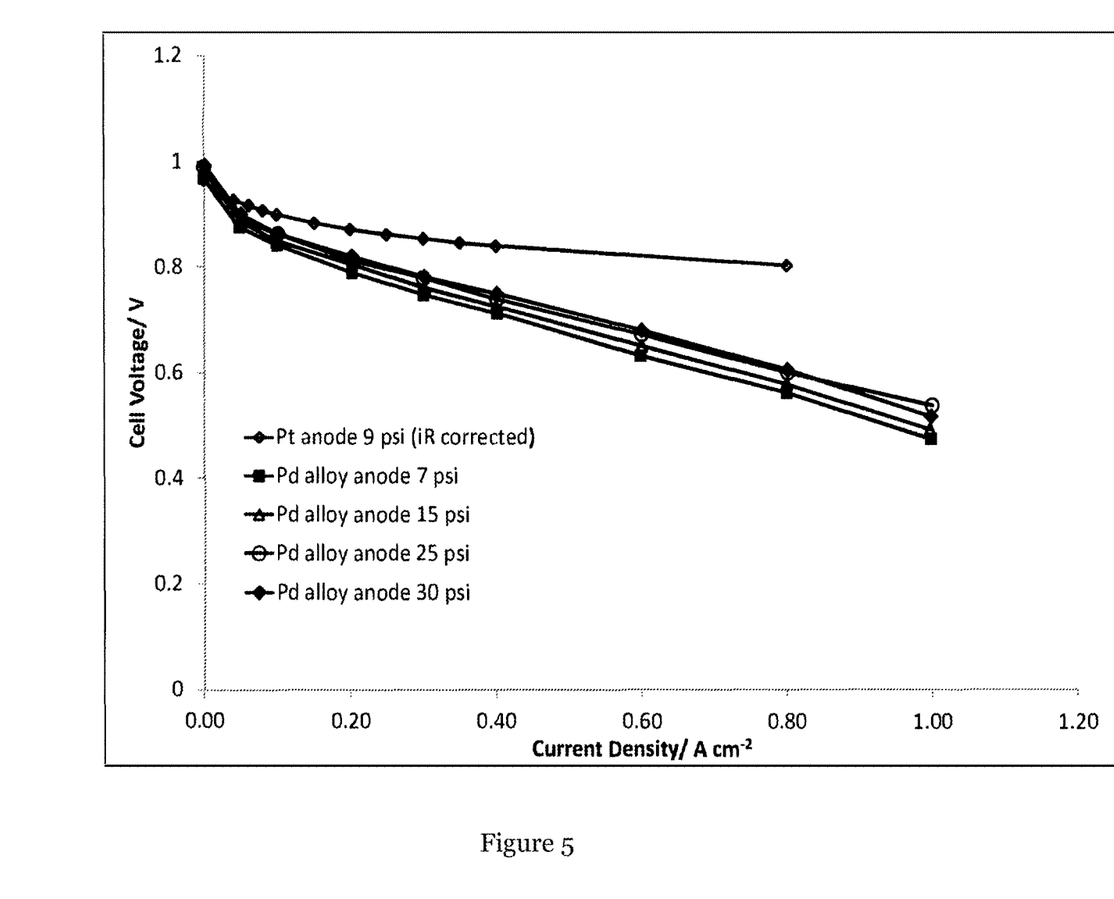
FIG. 5 shows polarisation plots obtained in H$_2$—O$_2$ for Membrane Electrode Assemblies (MEAs) at 80° C. at various pressures (pressures shown in legend) for the 40 wt. % PdCoW catalyst at the anode (with a loading of 0.31 mg of PdCoW alloy cm$^{-2}$) and a standard Pt catalyst at the cathode. Also shown for comparison is a polarisation curve (iR corrected) for an MEA containing an anode catalyst of Pt/C with an anode Pt loading of 0.3 mg cm$^{-2}$, with a back pressure of 9 psi.

The MEA was operated with a hydrogen and oxygen feed ($\lambda H_2$=1.5, $\lambda O_2$=2.5) at the anode and cathode respectively at 80° C. and at pressures of 7 psi, 15 psi, 25 psi and 30 psi. The active electrode area was 50 $cm^2$ and the membrane used was a standard IRD polymer electrolyte membrane (PFSA 30 μm). FIG. 5 shows the polarisation curves from an un-optimised MEA and shows a promising open circuit potential of around 1 V at all pressures. This result provides exemplification that the catalyst is indeed suitable as an anode catalyst for a hydrogen fuel cell, as this provides direct evidence of the use of the catalyst at the anode in a complete cell suitable for incorporation into a fuel cell stack.

FIG. 5 also shows, for comparison, the polarisation curve containing standard platinum on carbon catalyst at both anode and cathode (with an anode loading of 0.3 mg Pt $cm^{-2}$, with an ink containing 30 wt. % nafion, operated at 9 psi, all other conditions as above). The data shown for this standard catalyst has been iR corrected. In comparison to the data obtained for the Pd-alloy anode catalyst a similar open circuit potential is seen for the Pt anode catalyst, suggesting similar activity for the two anode catalysts. Loss in performance for the Pd-alloy catalyst anode containing MEA at higher current density is likely to be due to internal resistance and mass transport limitations. It is likely that these factors can be improved by optimisation of the catalyst ink.

The results set out above reveal that a catalyst according to the invention has good activity for the hydrogen oxidation reaction. The catalyst has been shown to have an advantage over pure palladium catalysts in that it does not significantly absorb hydrogen and therefore will not undergo large volume changes at potentials required for hydrogen oxidation. This advantage, and the fact that a catalyst similar to that of the example has already shown to be stable over a wide range of potentials seen in a fuel cell (in WO2007042841), suggests that these catalysts could find application as a cheaper replacement for platinum electrodes for anodes in fuel cells (PEM fuel cells and the hydrogen oxidation reaction in particular).

Although the catalyst has previously been shown as an effective oxygen reduction catalyst (in WO2007042841) it had been suggested that to produce good hydrogen evolution (and hence hydrogen oxidation) catalysts, palladium should be alloyed with an element that binds hydrogen less strongly. Both Co and W bind hydrogen at least as strongly as palladium and there is therefore a surprising effect that the catalyst appears active and attenuates hydrogen absorption. It is believed that reduced absorption of hydrogen by the palladium may be due to changes in the lattice structure of palladium by the alloying elements.

From the results shown in the current investigation it might be expected that palladium could be alloyed with other elements that bind hydrogen and CO at least as strongly as Pd to provide promising hydrogen oxidation (and evolution) catalysts. This may include but not be limited to ternary palladium alloys with which may have already been shown or suggested to be stable in a fuel cell environment, e.g. PdCoAu, PdCoMo, PdCoCr, PdFeCr. Accordingly, the invention is not limited to the scope of the example set out above, but should be determined by reference to the following claims.

The catalyst according to the invention is used in the anode of a fuel cell.

The detailed construction of PEM fuel cells is well known to those familiar with such technology. Fuel Cell Handbook (Seventh Edition) by EG&G Technical Services, Inc., available to the public from the National Technical Information Service, U.S. Department of Commerce, 5285 Port Royal Road, Springfield, Va. 22161, U.S.A. and incorporated by reference, provides useful information for those less familiar with the art; Section 3, Polymer Electrolyte Fuel Cells is particularly relevant. Typically the fuel cell comprises an anode, a cathode, a proton exchange membrane between the anode and the cathode, and catalysts for the catalytic oxidation of a hydrogen-containing fuel and for the reduction of oxygen.

A typical hydrogen fuel cell has a hydrogen electrode (fuel electrode or anode) and an air electrode (oxidizer electrode or cathode). In between the electrodes, a proton exchange membrane serves as an electrolyte. The proton exchange membrane, the anode and the cathode are generally integrated into one body, so there is no contact resistance between the electrodes and the proton exchange membrane. Electricity is generated by hydrogen oxidation by introducing hydrogen into a hydrogen fuel chamber open to the anode, while oxygen, preferably as air, is introduced into an air chamber open to the cathode. The hydrogen is oxidised at the anode to produce hydrogen ions (protons) which pass through the PEM, and electrons. An electric current is withdrawn from the fuel cell into an outer circuit by current collectors in contact with the electrodes. Hydrogen ions migrate through the acidic proton exchange membrane and react with oxygen and electrons from the outer circuit at the cathode to form water.

The catalyst can be supported on a commercially available support such as but not limited to carbon; carbon supported catalysts are normally used for fuel cells because surface area of catalysts is greatly increased by using carbon support and carbon has sufficient electronic conductivity and chemical stability under fuel cell operating conditions. Alternative supports include metal oxides, for example. The preparation of dispersed alloy on carbon supports may be achieved in a number of ways. For instance, the alloy catalysts may be formed by reduction of a mixture of compounds of component metals, or heat treatment of carbon supported Pd wherein the other metal salts are precipitated or adsorbed onto the surface. Alternatively, the alloy particles may be formed on the carbon supports by physical deposition, such as sputtering, physical evaporation and chemical vapour deposition.

The fuel cell includes an electrolyte such as a proton exchange membrane (e.g. NAFION® available from Du Pont) alloy catalysts may be deposited directly on the surface of the proton exchange membrane for contact with a current collector. Alternatively the alloy catalysts may be deposited on the surface of an anode support, or within the pores of a porous anode support, such as a carbon structure that is placed in contact with the membrane.

What is claimed is:

1. A fuel cell comprising:
   a hydrogen oxidising fuel cell anode comprising a substrate and a catalyst, the catalyst comprising an alloy of Pd and at least two other transition metals, at least one of which binds to hydrogen and/or carbon monoxide at least as strongly as Pd does, wherein the catalyst comprises a PdCoW alloy;
   a cathode;
   an electrolyte;
   a fuel supply; and
   a supply of oxidant;
   wherein the PdCoW alloy exhibits reduced absorption of hydrogen relative to unalloyed palladium.

2. The fuel cell of claim 1, wherein two of the at least two other transition metals bind to hydrogen and/or carbon monoxide at least as strongly as Pd does.

3. The fuel cell of claim 1, wherein at least one of the at least two other transition metals binds to hydrogen and/or carbon monoxide more strongly than Pd does.

4. The fuel cell of claim 1, wherein two of the at least two other transition metals bind to hydrogen and/or carbon monoxide more strongly than Pd does.

5. The fuel cell of claim 1, wherein the catalyst consists essentially of Pd, Co and W.

6. The fuel cell of claim 1, wherein the substrate is non-metallic.

7. The fuel cell of claim 6, wherein the substrate is carbon.

8. A fuel cell according to claim 1 wherein the fuel supply supplies hydrogen gas.

9. A fuel cell according to claim 1 wherein the electrolyte comprises a proton exchange membrane.

10. A method of oxidising fuel in a fuel cell comprising supplying fuel to an anode of the fuel cell, wherein the anode is as claimed in claim 1.

11. A method according to claim 10 wherein the fuel is hydrogen.

12. A method of generating electricity in a fuel cell according to claim 1 comprising supplying fuel to the anode and an oxidant to the cathode.

* * * * *